United States Patent
Yan et al.

(10) Patent No.: US 11,159,068 B2
(45) Date of Patent: Oct. 26, 2021

(54) ROTOR AND MOTOR INCLUDING THE ROTOR

(71) Applicant: Nidec Corporation, Kyoto (JP)

(72) Inventors: Guo-Jhih Yan, Taipei (TW); Hsiu-Ying Lin, Taipei (TW); Keng-Chang Wu, Taipei (TW)

(73) Assignee: NIDEC CORPORATION, Kyoto (JP)

( * ) Notice: Subject to any disclaimer, the term of this patent is extended or adjusted under 35 U.S.C. 154(b) by 117 days.

(21) Appl. No.: 16/491,597

(22) PCT Filed: May 21, 2018

(86) PCT No.: PCT/JP2018/019560
§ 371 (c)(1),
(2) Date: Sep. 6, 2019

(87) PCT Pub. No.: WO2018/216667
PCT Pub. Date: Nov. 29, 2018

(65) Prior Publication Data
US 2021/0135523 A1    May 6, 2021

(30) Foreign Application Priority Data
May 22, 2017  (CN) .......................... 201710363923.7

(51) Int. Cl.
*H02K 1/27*      (2006.01)
*H02K 1/28*      (2006.01)
*H02K 21/24*   (2006.01)

(52) U.S. Cl.
CPC .............. *H02K 1/2793* (2013.01); *H02K 1/28* (2013.01); *H02K 21/24* (2013.01)

(58) Field of Classification Search
CPC ......... H02K 1/2793; H02K 21/24; H02K 1/28
See application file for complete search history.

(56) References Cited

U.S. PATENT DOCUMENTS 6,037,696 A * 3/2000 Sromin ................ H02K 1/2793
                                                                  310/112
7,187,098 B2 * 3/2007 Hasebe .................. H02K 21/24
                                                                  310/156.43

(Continued)

FOREIGN PATENT DOCUMENTS

JP       2004-129374 A     4/2004
JP       2007-089270 A     4/2007

(Continued)

OTHER PUBLICATIONS

Machine Translation, ASANO, JP-2010279185-A, Dec. 2010. (Year: 2010).*

(Continued)

*Primary Examiner* — Thomas Truong
(74) *Attorney, Agent, or Firm* — Keating & Bennett

(57) ABSTRACT

A motor includes a rotor including a rotating shaft, a nonmagnetic rotary frame, yokes arranged separately in the nonmagnetic rotary frame, and magnets arranged on surfaces of the yokes at least on one side of the yokes. To hold the yokes and the magnets, the nonmagnetic rotary frame includes a first annular rib that extends along a circumferential direction on a radially outer side of the rotating shaft, radially extending ribs that extend from a radially outer side of the first annular rib along radial directions, and a second annular rib joined to the radially extending ribs and concentric with the first annular rib.

13 Claims, 5 Drawing Sheets

(56) References Cited

U.S. PATENT DOCUMENTS

| | | | |
|---|---|---|---|
| 7,402,934 B1 | 7/2008 | Gabrys | |
| 7,960,884 B2 | 6/2011 | Miyata et al. | |
| 8,836,192 B2 | 9/2014 | Wang et al. | |
| 2010/0225195 A1* | 9/2010 | Asano | H02K 21/24 |
| | | | 310/216.067 |
| 2012/0262022 A1* | 10/2012 | Takemoto | H02K 1/2793 |
| | | | 310/156.35 |

FOREIGN PATENT DOCUMENTS

| | | | |
|---|---|---|---|
| JP | 2010-279185 A | | 12/2010 |
| JP | 2010279185 A | * | 12/2010 |
| JP | 2011-239570 A | | 11/2011 |
| WO | 2015/159418 A1 | | 10/2015 |

OTHER PUBLICATIONS

Official Communication issued in International Patent Application No. PCT/JP2018/019560, dated Jul. 17, 2018.

* cited by examiner

ROTOR AND MOTOR INCLUDING THE ROTOR

CROSS REFERENCE TO RELATED APPLICATIONS

This is a U.S. national stage of PCT Application No. PCT/JP2018/019560, filed on May 21, 2018, and priority under 35 U.S.C. § 119(a) and 35 U.S.C. § 365(b) is claimed from Chinese Application No. 201710363923.7, filed May 22, 2017; the entire disclosures of each application are hereby incorporated herein by reference.

1. FIELD OF THE INVENTION

The present application relates to the field of motors, and, in particular, relates to a rotor and a motor including the rotor.

2. BACKGROUND

A known axial magnetic flux motor often has a rotor including a disk-shaped yoke made of one low-carbon steel, and having a plurality of magnets attached to the disk-shaped yoke. The disk-shaped yoke is arranged to guide magnetic flux circuits as a magnetic permeable assembly. Here, the disk-shaped yoke involves a loss due to an eddy current. A known technique of defining a yoke of an axial magnetic flux motor by laminated silicon steel sheets has been proposed to solve such a problem. However, producing a yoke by laminating silicon steel sheets would involve a complicated production and an increased production cost, although this may not happen in the case of a common radial motor.

It should be noted that the presentation of the above related-art techniques has been made to facilitate clearer and more thorough explanation of a proposed technique of the present application, and merely to facilitate an understanding by those skilled in the art. The presentation of the proposed techniques in the Background section of the present application should not be considered to certify that the above-mentioned proposed techniques are known to those skilled in the art.

SUMMARY

According to an example embodiment of the present disclosure, there is provided a rotor including a rotating shaft to rotate about a central axis, a nonmagnetic rotary frame to rotate about the rotating shaft together with the rotating shaft, a plurality of yokes arranged separately in the nonmagnetic rotary frame, and magnets arranged on surfaces of the plurality of yokes at least on one side of the plurality of yokes. To hold the plurality of yokes and the magnets, the nonmagnetic rotary frame includes a first annular rib that extends along a circumferential direction on a radially outer side of the rotating shaft, a plurality of radially extending ribs that extend from a radially outer side of the first annular rib along radial directions, and a second annular rib joined to the plurality of radially extending ribs and arranged to be concentric with the first annular rib. One of the plurality of yokes includes two of the magnets arranged thereon, and the two magnets are arranged to include a north pole and a south pole, respectively, facing toward a stator.

According to another example embodiment of the present disclosure, there is provided a motor including the rotor according to the above-described example embodiment, and a stator arranged opposite to the rotor.

Example embodiments of the present disclosure are disclosed in detail with reference to descriptions provided below and the accompanying drawings. It should be understood that example embodiments of the present disclosure are not limited in scope thereby. Example embodiments of the present disclosure include various changes, modifications, and equivalents within the spirit of the appended claims and within the scope of the claims.

A description of one example embodiment and/or a feature of one example embodiment presented may be used in one or more other example embodiments in the same or a similar form, or be combined with features of other example embodiments, or may substitute for features of other example embodiments.

It should be stressed that the terms "to include", "to have", "to comprise", and so on are used herein to indicate the presence of a feature, a constituent member, or a component, without excluding presence or addition of one or more other features, constituent members, or components.

The above and other elements, features, steps, characteristics and advantages of the present disclosure will become more apparent from the following detailed description of the example embodiments with reference to the attached drawings.

DETAILED DESCRIPTION

The above-described and other features in example embodiments of the present disclosure will become more apparent from the following description when taken in conjunction with the accompanying drawings. While the description and the drawings specifically disclose specific example embodiments of the present disclosure and some example embodiments in which the principles of the present disclosure can be adopted, it should be noted that the present disclosure is not limited to the example embodiments described below, but includes all modifications, variations, and equivalents thereof within the scope of the appended claims.

In the following description of the present disclosure, a direction parallel to a direction in which a rotation axis extends is referred to by the term "axial direction", "axial", or "axially", radial directions centered on the rotation axis are each referred to by the term "radial direction", "radial", or "radially", and a circumferential direction about the rotation axis is referred to by the term "circumferential direction", "circumferential", or "circumferentially", for the sake of convenience in description.

A rotor and a motor according to example embodiments of the present disclosure will be described below with reference to the accompanying drawings.

Figure 1:
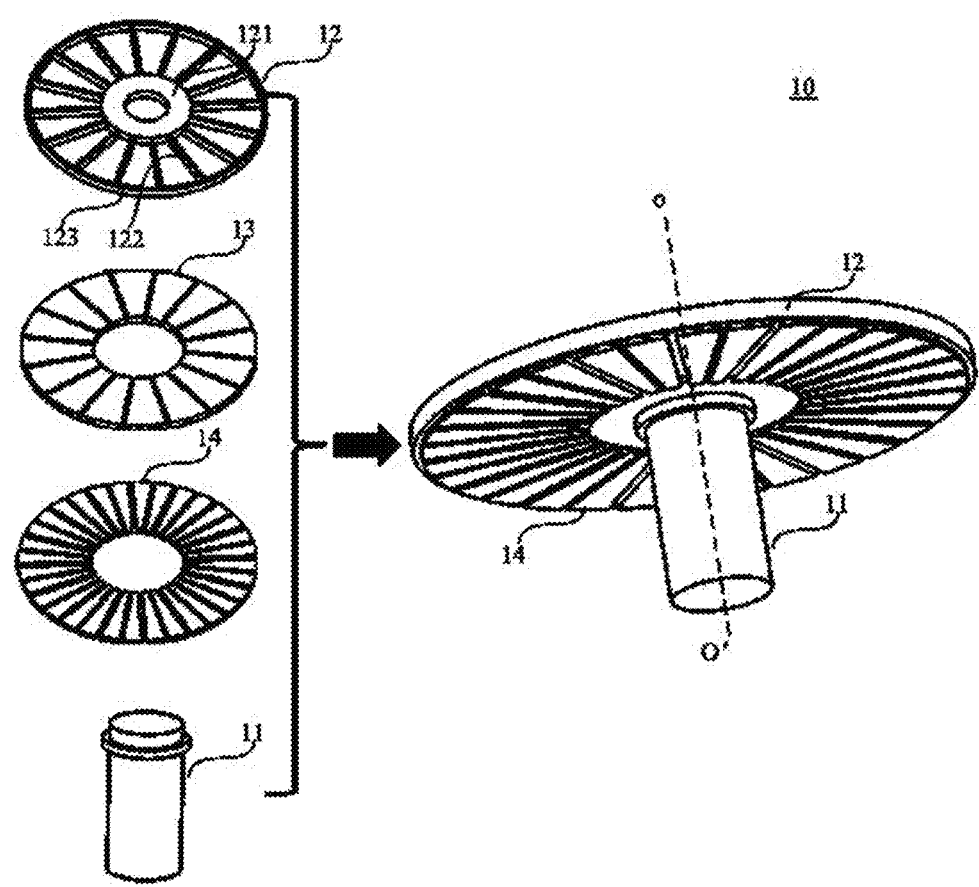
FIG. 1 is one schematic diagram of a rotor according to a first example embodiment of the present disclosure.

A first example embodiment of the present disclosure provides a rotor 10. FIG. 1 is a schematic diagram of the rotor 10 according to the present example embodiment, and illustrates various constituent portions of the rotor 10 and the overall structure of the rotor 10. As illustrated in FIG. 1, the rotor 10 includes a rotating shaft 11, a nonmagnetic rotary frame 12, a plurality of yokes 13, and a plurality of magnets 14. In FIG. 1, only one of the yokes 13 and one of the magnets 14 are indicated by reference numerals for the sake of convenience in explanation.

In the present example embodiment, as illustrated in FIG. 1, the rotating shaft 11 is arranged to rotate about a central axis OO', and the nonmagnetic rotary frame 12 is arranged to rotate about the rotating shaft 11 together with the rotating shaft 11. The plurality of yokes 13 are arranged separately in the nonmagnetic rotary frame 12, and the magnets 14 are arranged on surfaces of the yokes 13 at least on one side. To hold the plurality of yokes 13 and the magnets 14, the nonmagnetic rotary frame 12 includes a first annular rib 121 arranged to extend along a circumferential direction on a radially outer side of the rotating shaft 11, a plurality of radially extending ribs 122 arranged to extend from a radially outer side of the first annular rib 121 along radial directions, and a second annular rib 123 joined to the plurality of radially extending ribs 122 and arranged to be concentric with the first annular rib 121. The second annular rib 123 is arranged radially outside of the first annular rib 121.

In the present example embodiment, one of the plurality of yokes 13 is arranged to have two of the magnets 14 arranged thereon, and the two magnets 14 are arranged to have a north pole and a south pole, respectively, facing toward a stator (which is not illustrated in FIG. 1). That is, two of the magnets 14 are attached to each of the plurality of yokes 13. In the example embodiment described above, the plurality of yokes 13 are arranged separately in the nonmagnetic rotary frame 12, and two of the magnets 14, having the north pole and the south pole, respectively, facing toward the stator, are arranged on any one of the yokes 13. This arrangement makes loops of magnetic flux paths that join at the plurality of yokes 13 smaller, which may reduce a loss due to an eddy current. As a result, an improvement in efficiency of a motor can be achieved according to an example embodiment of the present disclosure. In addition, production of the rotor can be facilitated to achieve a reduced production cost. Further, according to an example embodiment of the present disclosure, the use of the plurality of yokes separated from one another enables an effective use of a magnetic permeable material, and makes it possible to reduce the amount of unnecessary use of a magnetic material, leading to a reduced material cost.

In the present example embodiment, of the plurality of magnets 14, the magnet having the north pole facing toward the stator and the magnet having the south pole facing toward the stator are arranged to have a circumferential gap therebetween. This arrangement allows magnetic lines of flux generated by the magnets to be effectively passed to the opposed stator, which leads to a reduction in a magnetic flux leakage and an improvement in performance of the motor. Note, however, that the present example embodiment is not limited to this example, and that, for example, no gap may be defined between the magnets.

Figure 2:
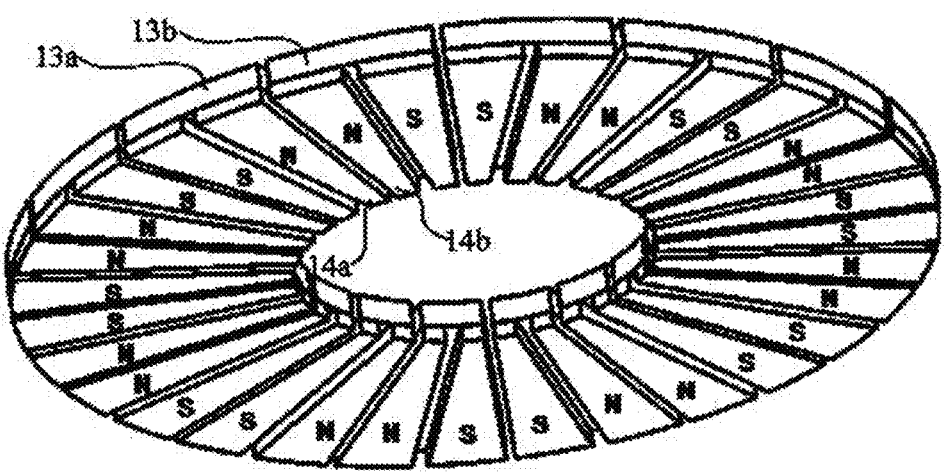
FIG. 2 is a schematic diagram illustrating one arrangement of magnets and yokes of the rotor according to the first example embodiment of the present disclosure.

In one example embodiment, two adjacent ones of the magnets arranged on adjacent ones of the yokes are arranged to have the same pole facing toward the stator. As illustrated in FIG. 2, two adjacent magnets 14a and 14b, which are arranged on a yoke 13a and a yoke 13b adjacent to each other, both have the north pole facing toward the stator. This makes the loops of the magnetic flux paths that join at the plurality of yokes 13 smaller, which may reduce the loss due to an eddy current.

Figure 3:
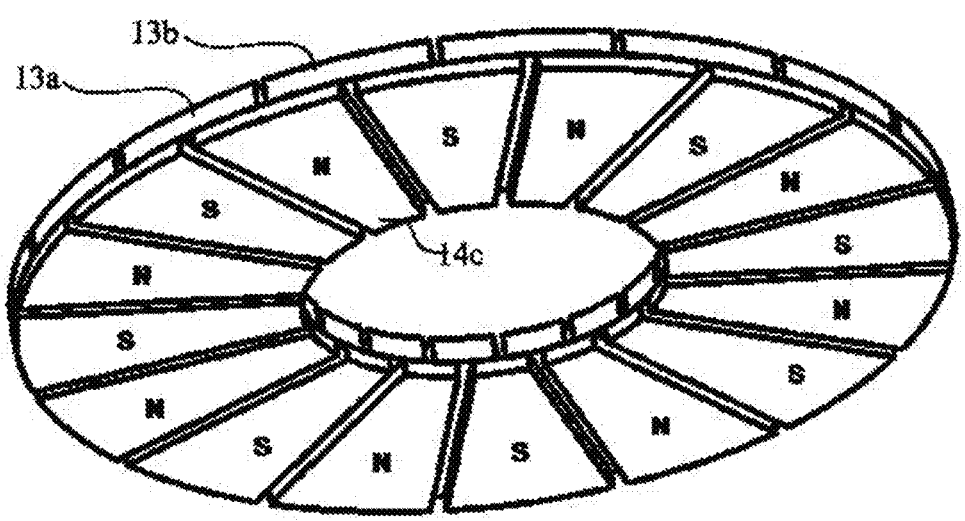
FIG. 3 is a schematic diagram illustrating another arrangement of the magnets and the yokes of the rotor according to the first example embodiment of the present disclosure.

In one example embodiment, one of the plurality of magnets is arranged to extend over two adjacent ones of the yokes. As illustrated in FIG. 3, a magnet 14c is arranged to have a portion thereof attached to a yoke 13a and another portion thereof attached to a yoke 13b, which is adjacent to the yoke 13a. This makes the loops of the magnetic flux paths that join at the plurality of yokes 13 smaller, reducing the extent of change in magnetic flux, which may reduce the loss due to an eddy current.

It should be noted that distributions of the magnetic poles of the magnets 14 as illustrated in FIGS. 2 and 3 are merely presented for the purposes of illustration and not limitation, and that the distribution of the magnetic poles of the magnets 14 may alternatively be in accordance with another system.

In the present example embodiment, the nonmagnetic rotary frame 12 may be made of a stainless steel material. This may lead to an additional reduction in the loss due to an eddy current. Note, however, that the present example embodiment is not limited to this example, and that the nonmagnetic rotary frame 12 may alternatively be made of another material.

In the present example embodiment, each yoke 13 may be defined by laminated steel sheets, or may be made of a soft magnetic composite material. This may lead to an additional reduction in the loss due to an eddy current. Note, however, that the present example embodiment is not limited to this example, and that the yoke 13 may alternatively be made of another material. For example, the yoke 13 may alternatively be made of a low-carbon steel, such as S10C. As illustrated in FIG. 1, each yoke 13 may be in a fan shape. This may lead to easier assembly. Note, however, that the present example embodiment is not limited to this example, and that the yoke may alternatively be in another shape.

In the present example embodiment, each yoke 13 may be fixed to the nonmagnetic rotary frame 12 through an adhesive, but the present example embodiment is not limited to this example. The yoke 13 may alternatively be fixed to the nonmagnetic rotary frame 12 by another method. The magnets 14 may be fixed to the yokes 13 through an adhesive. This may stabilize the structure of the rotor.

Figure 4:
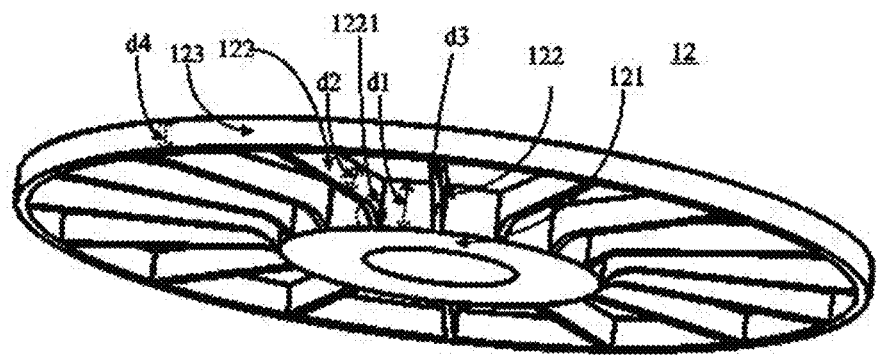
FIG. 4 is one schematic diagram of a nonmagnetic rotary frame of the rotor according to the first example embodiment of the present disclosure.

FIG. 4 is a schematic diagram of a nonmagnetic rotary frame according to an example embodiment of the present disclosure. As illustrated in FIG. 4, the first annular rib 121 is arranged to have an axial dimension d1 greater than an axial dimension d2 of each of the radially extending ribs 122. This allows positioning. For example, an arch-shaped portion 1221 may be defined at a junction of the first annular rib 121 with each of the radially extending ribs 122. This makes d1 greater than d2. Note, however, that the present example embodiment is not limited to this example, and that, for example, the arch-shaped portion 1221 may alternatively be in another shape, such as, for example, a triangle or a trapezoid.

In the present example embodiment, the dimension d3 of each of the radially extending ribs 122 of the nonmagnetic rotary frame 12 measured in a direction perpendicular to both a radial direction and an axial direction is 2 mm or less. This contributes to ensuring that the motor has good performance.

In the present example embodiment, the nonmagnetic rotary frame 12 is arranged to have an axial dimension equal to or smaller than a combined axial dimension of the yoke 13 and the magnet 14. For example, as illustrated in FIG. 4, the second annular rib 123 is arranged to have an axial dimension d4 equal to or smaller than the combined axial dimension of the yoke 13 and the magnet 14. This leads to a reduced thickness of the motor.

According to the rotor according to the present example embodiment, the loops of the magnetic flux paths that join at the plurality of yokes 13 are made smaller, and therefore, a reduction in the loss due to an eddy current and an improvement in the efficiency of the motor can be achieved, and in addition, the production of the rotor can be facilitated to achieve a reduced cost.

Figure 5:
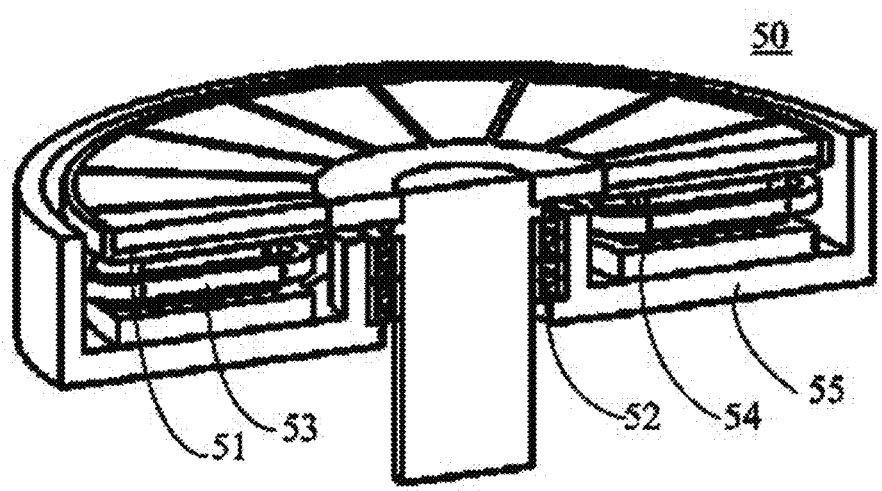
FIG. 5 is a sectional view of a motor according to a second example embodiment of the present disclosure.

A second example embodiment of the present disclosure provides a motor 50. FIG. 5 is a sectional view of the motor 50 according to the present example embodiment, FIG. 6 is a schematic diagram of constituent members of the motor 50 according to the present example embodiment, and FIG. 7 is an overall schematic diagram of the motor 50 according to the present example embodiment.

Figure 6:
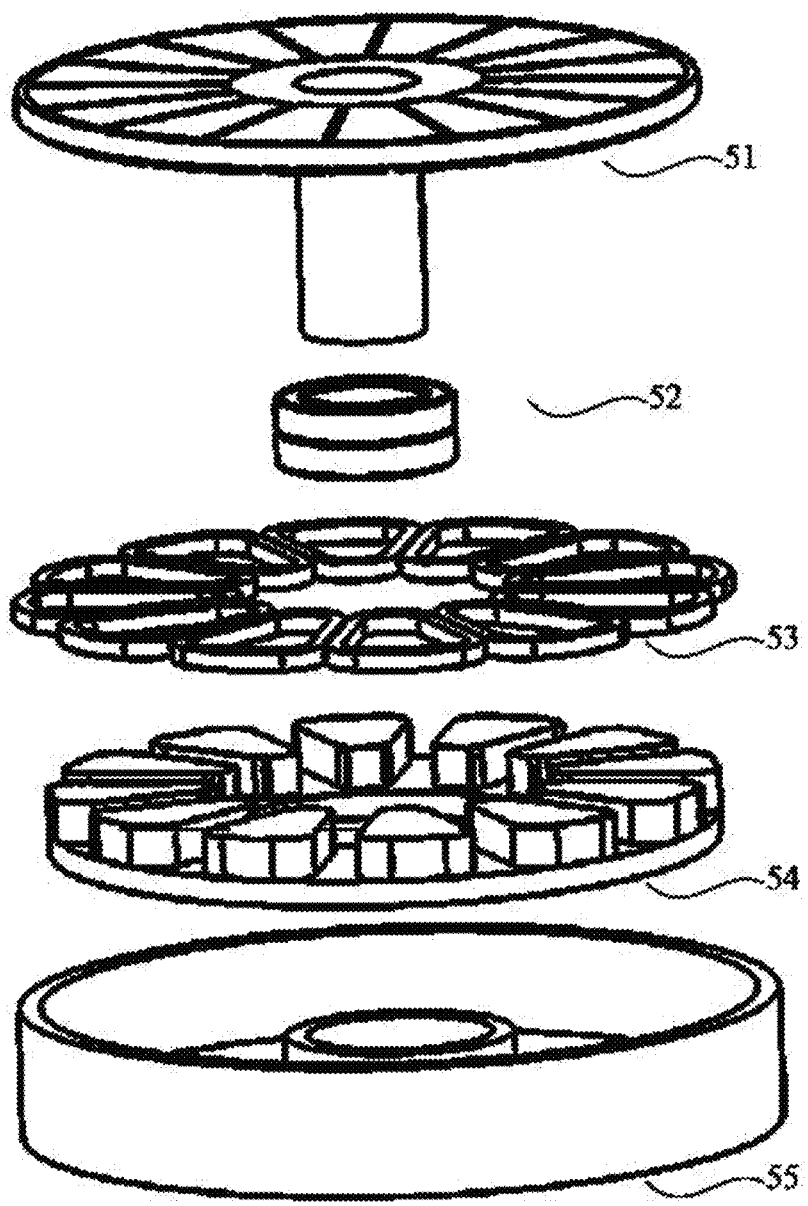
FIG. 6 is an exploded view of the motor according to the second example embodiment of the present disclosure.
Figure 7:
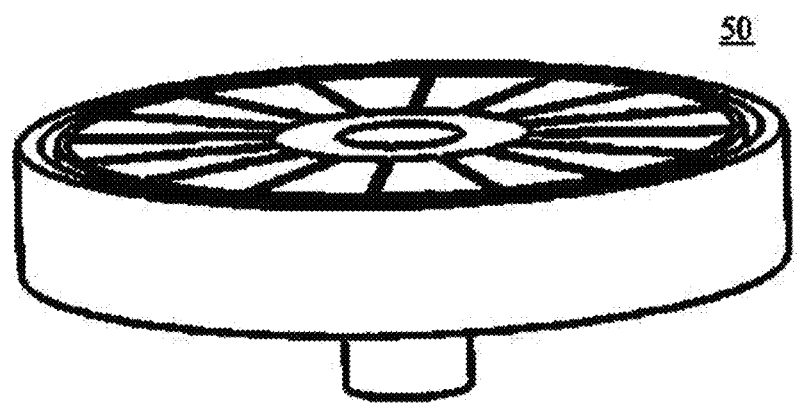
FIG. 7 is a schematic diagram of the motor according to the second example embodiment of the present disclosure.

As illustrated in FIGS. 5 to 7, the motor 50 includes a rotor 51, and a stator 54 arranged opposite to the rotor 51. The rotor 51 may be the rotor 10 according to the above-described first example embodiment. The structure of the rotor in the motor according to the present example embodiment has been described in the above description of the first example embodiment, and a description thereof is therefore omitted here.

According to the motor according to the present example embodiment, the loops of the magnetic flux paths that join at the plurality of yokes 13 are made smaller, and therefore, a reduction in the loss due to an eddy current and an improvement in the efficiency of the motor can be achieved, and in addition, the production of the rotor can be facilitated to achieve a reduced cost.

As illustrated in FIGS. 5 to 7, the motor 50 further includes a bearing 52, coils 53, the stator 54, and a casing 55. Note, however, that this is not essential to the present disclosure, and that known techniques may be consulted regarding other members of the motor.

In the present example embodiment, the motor may be applied to any desirable electrical appliance. For example, the motor may be used as a robot joint motor or as a wheel motor of a transfer carrier. Alternatively, the motor may be used as a motor in an electrical appliance such as, for example, an indoor unit of an air conditioner, an outdoor unit of an air conditioner, a water server, a vacuum cleaner, a compressor, a blower, or a mixer, or may be used as a motor in any of a variety of information appliances, industrial appliances, and so on.

With reference to the accompanying drawings, example embodiments of the present disclosure have been described in detail above, and possible applications of the principles of the present disclosure have been specified above. It should be understood, however, that implementations of the present disclosure are not limited to manners of the above-described example embodiments, and also include all changes, corrections, equivalents, and so on within the scope and gist of the present disclosure.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor comprising:
a rotating shaft to rotate about a central axis;
a nonmagnetic rotary frame to rotate about the rotating shaft together with the rotating shaft
a plurality of yokes arranged separately in the nonmagnetic rotary frame; and
magnets arranged on surfaces of the yokes at least on one side of the plurality of yokes; wherein
to hold the plurality of yokes and the magnets, the nonmagnetic rotary frame includes a first annular rib that extends along a circumferential direction on a radially outer side of the rotating shaft, a plurality of radially extending ribs that extend from a radially outer side of the first annular rib along radial directions, and a second annular rib joined to the plurality of radially extending ribs and arranged to be concentric with the first annular rib;
one of the plurality of yokes includes two of the magnets arranged thereon, and the two magnets are arranged to include a north pole and a south pole, respectively, facing toward a stator; and
one of the magnets is arranged on two adjacent ones of the plurality of yokes.

2. The rotor according to claim 1, wherein, of the magnets, the magnet including the north pole facing toward the stator and the magnet including the south pole facing toward the stator are provided with a circumferential gap therebetween.

3. The rotor according to claim 1, wherein two adjacent ones of the magnets arranged on adjacent ones of the plurality of yokes include a same pole facing toward the stator.

4. The rotor according to claim 1, wherein the nonmagnetic rotary frame is made of a stainless steel material.

5. The rotor according to claim 1, wherein each of the plurality of yokes is defined by laminated steel sheets or made of a magnetic composite material.

6. The rotor according to claim 1, wherein a dimension of each of the radially extending ribs of the nonmagnetic rotary frame measured in a direction perpendicular or substantially perpendicular to both a radial direction and an axial direction is about 2 mm or less.

7. The rotor according to claim 1, wherein the nonmagnetic rotary frame has an axial dimension equal to or smaller than a combined axial dimension of one of the plurality of yokes and the magnet.

8. The rotor according to claim 1, wherein each of the plurality of yokes is in a fan shape.

9. The rotor according to claim 1, wherein each of the plurality of yokes is fixed to the nonmagnetic rotary frame through an adhesive.

10. The rotor according to claim 1, wherein the magnets are fixed to the plurality of yokes through an adhesive.

11. The rotor according to claim 1, wherein the first annular rib has an axial dimension greater than an axial dimension of each of the radially extending ribs.

12. An axial gap motor comprising the rotor of claim 1, and a stator opposite to the rotor.

13. The rotor according to claim 1, wherein the one of the magnets is arranged on axial surfaces of the two adjacent ones of the plurality of yokes.

* * * * *